United States Patent
Baldwin et al.

(10) Patent No.: US 11,274,042 B2
(45) Date of Patent: Mar. 15, 2022

(54) VALORIZATION OF BIO-OILS

(71) Applicant: Alliance for Sustainable Energy, LLC, Golden, CO (US)

(72) Inventors: Robert Milton Baldwin, Evergreen, CO (US); Mark R. Nimlos, Golden, CO (US); Andrew Nolan Wilson, Denver, CO (US); Maarit Kristiina Iisa, Golden, CO (US)

(73) Assignee: Alliance for Sustainable Energy, LLC, Golden, CO (US)

( * ) Notice: Subject to any disclaimer, the term of this patent is extended or adjusted under 35 U.S.C. 154(b) by 109 days.

(21) Appl. No.: 16/253,016

(22) Filed: Jan. 21, 2019

(65) Prior Publication Data

US 2019/0225497 A1    Jul. 25, 2019

Related U.S. Application Data

(60) Provisional application No. 62/619,437, filed on Jan. 19, 2018.

(51) Int. Cl.
| | | |
|---|---|---|
| C01B 32/205 | (2017.01) | |
| C10B 53/02 | (2006.01) | |
| C10B 55/00 | (2006.01) | |
| C10B 57/04 | (2006.01) | |

(52) U.S. Cl.
CPC .......... C01B 32/205 (2017.08); C10B 53/02 (2013.01); C10B 55/00 (2013.01); C10B 57/045 (2013.01); *C01P 2002/60* (2013.01); *C01P 2002/72* (2013.01); *C01P 2006/80* (2013.01)

(58) Field of Classification Search
CPC combination set(s) only.
See application file for complete search history.

(56) References Cited

U.S. PATENT DOCUMENTS

2016/0177208 A1* 6/2016 Elkasabi ................. C10L 5/447
44/605

FOREIGN PATENT DOCUMENTS

JP    2003297357 A  * 10/2003

OTHER PUBLICATIONS

Elkasabi, Yaseen, Akwasi A. Boateng, and Michael A. Jackson. "Upgrading of bio-oil distillation bottoms into biorenewable calcined coke." Biomass and Bioenergy 81 (2015): 415-423.*
Zhu, Huihui, et al. "One-step preparation of graphene nanosheets via ball milling of graphite and the application in lithium-ion batteries." Journal of materials science 51.8 (2016): 3675-3683.*
Shams, S. Saqib, et al. "Synthesis of graphene from biomass: a green chemistry approach." Materials Letters 161 (2015): 476-479.*
Iisa, Kristiina, et al. "Improving biomass pyrolysis economics by integrating vapor and liquid phase upgrading." Green chemistry 20.3 (2018): 567-582.*
English machine translation of JP2003297357A (Year: 2003).*

* cited by examiner

Primary Examiner — Richard M Rump
(74) Attorney, Agent, or Firm — Sam J. Barkley

(57) ABSTRACT

Methods are disclosed to make coke, graphite, graphene and other materials from biomass derived bio-oil.

6 Claims, 9 Drawing Sheets

VALORIZATION OF BIO-OILS

CROSS-REFERENCE TO RELATED APPLICATIONS

This application claims priority under 35 U.S.C. § 119 to U.S. Provisional Patent Application No. 62/619,437 filed on Jan. 19, 2018, the contents of which are hereby incorporated by reference in their entirety.

CONTRACTUAL ORIGIN

The United States Government has rights in this invention under Contract No. DE-AC36-08GO28308 between the United States Department of Energy and Alliance for Sustainable Energy, LLC, the Manager and Operator of the National Renewable Energy Laboratory.

BACKGROUND

Pyrolysis is the thermal decomposition of biomass occurring in the absence of oxygen. It is the fundamental chemical reaction that is the precursor of both the combustion and gasification processes and occurs naturally in the first two seconds. The products of biomass pyrolysis include biochar, bio-oil and gases including methane, hydrogen, carbon monoxide, and carbon dioxide. Depending on the thermal environment and the final temperature, pyrolysis will yield mainly biochar at low temperatures, less than 450° C., when the heating rate is quite slow, and mainly gases at high temperatures, greater than 800° C., with more rapid heating rates. At an intermediate temperature and under relatively high heating rates, the main product is bio-oil.

Pyrolysis processes can be categorized as slow pyrolysis or fast pyrolysis. Fast pyrolysis is currently the most widely used pyrolysis system. Slow pyrolysis takes several hours to complete and results in biochar as the main product. On the other hand, fast pyrolysis yields 60% bio-oil and takes seconds for complete pyrolysis. In addition, it gives 20% biochar and 20% syngas. Fast pyrolysis processes include open-core fixed bed pyrolysis, ablative fast pyrolysis, cyclonic fast pyrolysis, and rotating core fast pyrolysis systems.

Bio-oil residue is the bottoms from fractional distillation of pyrolysis oil and is a very low value and difficult to upgrade material. Bio-oil is a dark brown liquid and has a similar composition to the biomass starting material. It has a much higher density than woody materials which reduces storage and transport costs. Bio-oil is not suitable for direct use in standard internal combustion engines.

The current technology for producing graphite from petroleum or mineral sources is extremely inefficient, costly, and environmentally problematic.

SUMMARY

In an aspect, disclosed herein is a method for making coke derived from biomass, comprising pyrolyzing the biomass to make bio-oil; and distilling the bio-oil to produce light and heavy fractions; and calcining the heavy fractions; and graphitizing the heavy fractions. In an embodiment, the heavy fractions are calcined from about 700° C. to about 1000° C. In another embodiment, the heavy fractions are graphitized from about 2000° C. to about 3100° C. In an embodiment, bio-derived coke has greater than about 98% w/w carbon content, and less than about 0.01% w/w sulfur content, and less than about 0.05% w/w hydrogen content. In an embodiment, the bio-derived coke has less than about 0.11% w/w ash content. In another embodiment, the bio-derived coke has a charge capacity of greater than about 300 mAhg$^{-1}$. In an embodiment, a method for making graphite derived from biomass is disclosed that includes pyrolyzing the biomass to make bio-oil; and distilling the bio-oil to produce light and heavy fractions; and calcining the heavy fractions; and graphitizing the heavy fractions. In an embodiment, the heavy fractions are calcined from about 700° C. to about 1000° C. In another embodiment, the heavy fractions are graphitized from about 2000° C. to about 3100° C. In another embodiment, the graphite has greater than about 98% w/w carbon content. In an embodiment, the graphite has less than about 0.01% w/w sulfur content. In an embodiment, the graphite has less than about 0.05% w/w hydrogen content. In an embodiment, the graphite has less than about 0.11% w/w ash content. In another embodiment, the graphite has a charge capacity of greater than about 300 mAhg–1.

In an aspect, a method for making graphene derived from biomass is disclosed herein that includes pyrolyzing the biomass to make bio-oil; and distilling the bio-oil to produce light and heavy fractions; and calcining the heavy fractions; and graphitizing the heavy fractions. In an embodiment, the heavy fractions are calcined from about 700° C. to about 1000° C. In another embodiment, the heavy fractions are graphitized from about 2000° C. to about 3100° C. In an embodiment, the graphene has greater than about 98% w/w carbon content, and less than about 0.01% w/w sulfur content, and less than about 0.05% w/w hydrogen content. In an embodiment, the graphene has less than about 0.11% w/w ash content. In an embodiment, the graphene has a charge capacity of greater than about 300 mAhg$^{-1}$.

In an aspect, a method for making coke derived from biomass is disclosed having the steps of pyrolyzing the biomass to make bio-oil; and distilling the bio-oil to produce both light and heavy fractions; and calcining the heavy fractions; and graphitizing the heavy fractions. In an embodiment, the coke has greater than about 98% w/w carbon content. In an embodiment, the coke has less than about 0.01% w/w sulfur content. In an embodiment, the coke has less than about 0.05% w/w hydrogen content. In an embodiment, the coke has less than about 0.11% w/w ash content. In an embodiment, the coke is used in the production of $TiO_2$. In another embodiment, the coke is used in the production of graphite. In yet another embodiment, the coke is used in the production of steel. In an embodiment, the coke is used in the production of carbon steel. In an embodiment, the coke is used as an anode for a lithium containing battery.

In an aspect, a method for making graphite derived from biomass is disclosed having the steps of pyrolyzing the biomass to make bio-oil; and distilling the bio-oil to produce both light and heavy fractions; and calcining the heavy fractions; and graphitizing the heavy fractions. In an embodiment, the graphite has greater than about 98% w/w carbon content. In an embodiment, the graphite has less than about 0.01% w/w sulfur content. In an embodiment, the graphite has less than about 0.05% w/w hydrogen content. In an embodiment, the graphite has less than about 0.11% w/w ash content. In an embodiment, the graphite is used in the production of $TiO_2$. In yet another embodiment, the graphite is used in the production of steel. In an embodiment, the graphite is used in the production of carbon steel. In an embodiment, the graphite is used as an anode for a lithium containing battery.

In an aspect, a method for making graphene derived from biomass is disclosed having the steps of pyrolyzing the biomass to make bio-oil; and distilling the bio-oil to produce both light and heavy fractions; and calcining the heavy fractions; and graphitizing the heavy fractions. In an embodiment, the graphene has greater than about 98% w/w carbon content. In an embodiment, the graphene has less than about 0.01% w/w sulfur content. In an embodiment, the graphene has less than about 0.05% w/w hydrogen content. In an embodiment, the graphene has less than about 0.11% w/w ash content. In an embodiment, the graphene is used in the production of $TiO_2$. In another embodiment, the graphene is used in the production of graphite. In yet another embodiment, the graphene is used in the production of steel. In an embodiment, the graphene is used in the production of carbon steel. In an embodiment, the graphene is used as an anode for a lithium containing battery.

Other objects, advantages, and novel features of the present invention will become apparent from the following detailed description of the invention when considered in conjunction with the accompanying drawings.

BRIEF DESCRIPTION OF THE DRAWINGS

FIG. 5a depicts x-ray diffraction (XRD) spectra of resid, resid calcined at 800° C., resid at 2800° C.; and commercially available graphite. FIG. 5b depicts the graphite crystal size of the samples whose XRD spectra are depicted in 5a.

FIG. 7a depicts the mass percent of various distillate fractions from the distillation of bio-crude. FIG. 7b depicts the $^1$H NMR spectrum of the residue left in the boiler after the distillation of the fractions of 7a.

DETAILED DESCRIPTION

Figure 1:
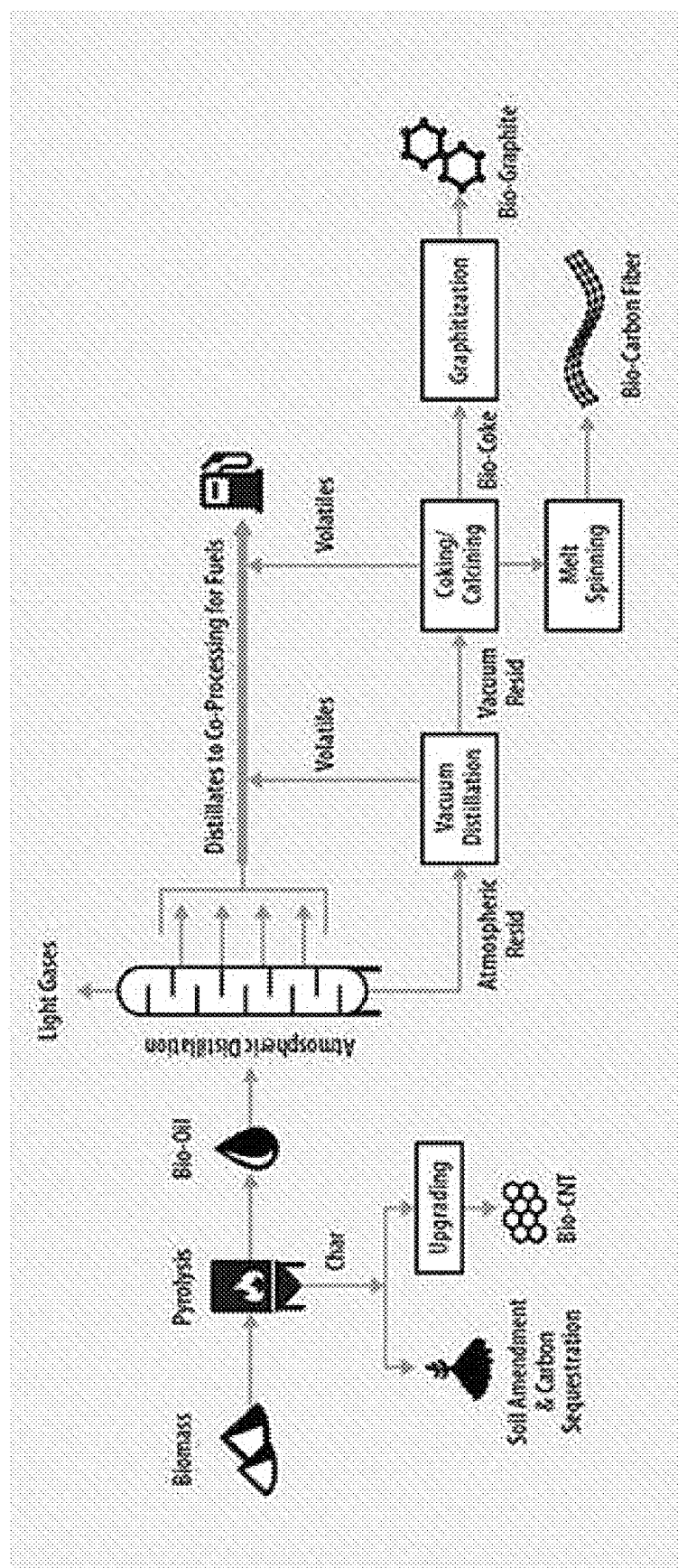
FIG. 1. depicts a valorization scheme for the production of bio-carbon products using methods disclosed herein.

The production of bio-graphite as contemplated herein will result in an improvement over current methods used for production of mineral or petroleum derived graphite and graphene. The discovery and development of innovative new pathways for producing functional replacements for mineral and synthetic graphite based on processes using renewable and sustainable feedstocks has the potential to revolutionize the energy storage industry by providing materials with significantly lower costs coupled with dramatically lower environmental manufacturing consequences.

Production of highly carbonaceous materials from biomass has the potential to target a number of medium- and high-value market sectors. At the low end, carbon from biomass could be used to replace carbon/graphite currently sourced from petroleum coke, coal tar, and natural mineral graphite. The global demand for these products is large: world-wide production of petroleum coke for use in anodes for aluminum manufacture and other applications is well over 100 million tonnes annually with more than half produced in the USA. An emerging application for high purity graphite is for anodes in lithium-ion batteries (LiB), which are critical components for energy storage and electric vehicles. Lithium ion batteries consume 10 to 15 times more graphite than lithium, and with the increasing production of electric vehicle and energy storage markets, there is a growing and potentially tremendous need for high grade graphite materials in the market.

Production of high-purity graphite by refining carbon from mineral and petroleum sources is energy intensive and environmentally problematic. Residuals from biomass pyrolysis provides a potential new source of high-quality carbon (including graphite) that is renewable, sustainable, and which can be produced without negative environmental consequences.

The commercial prospects for bio-graphite are substantial; the LiB market consumed roughly 80,000 tonnes/yr in 2015 and is expected to grow by 20% per year. Large-scale energy storage using LiBs is also being rapidly deployed; this application alone could consume as much graphite as all other uses combined. LiBs are set to dominate the emerging grid-connected PV storage market. Panasonic forecasts a 74.9% compound annual growth rate for LiB-based grid-scale energy storage with a share of 37.6% by 2020. A large and impactful use of LiBs is in electric vehicles, which are projected to have strong growth (up to 50% of new car sales by 2040). The Tesla gigafactory alone is estimated to boost graphite demand by as much as 30% by 2020. Selling prices in 2017 for coated spherical graphite ranged from $8-$10/kg; prices for LiB anode-grade graphite are about as high as $19/kg.

Due to the very low sulfur and transition metals (e.g. Va, Ni) content of bio-oil produced by pyrolysis with hot-gas or condensed-phase filtration, bio-graphite will be significantly cheaper than existing graphite. Economic analysis finds a cost of roughly $1.04/kg for hydrotreated bio-oil from catalytic fast pyrolysis (CFP). Smaller but significant markets exist in carbon capacitors, which are used for energy storage/delivery devices, and specialty carbons such as graphene.

Natural occurring graphite (mineral sourced graphite) contains significant amounts of contaminants that must be reduced or eliminated in order to make pure enough graphite and graphene for industrial applications. Upgrading of natural graphite includes many steps, including mining, floatation, drying, classification, pulverization (to 10-50 microns), spheronisation, purification (leaching with strong acids at high temperature to purity levels of 99.9-99.99%) and carbon coating to produce the final product. Mass loss in the spheronisation step alone can be as high as 50%. Upgrading of petroleum resid (residuum) to synthetic graphite involves calcining (450° C.) followed by graphitization to temperatures as high as 3100° C.; a final coating step is still required.

Currently, about 3 million gallons of bio-oil are produced per year. Bio-derived graphite (processed from bio-oil) can serve as a functional replacement for mineral and petroleum-sourced graphite.

Disclosed herein are methods for pyrolyzing biomass to make carbon products demonstrating improved features versus the carbon products produced by starting with petroleum-based feedstock. In an embodiment, bio-oil is treated by either fast pyrolysis or catalytic fast pyrolysis coupled with hot gas filtration to provide a pathway to high value, renewable carbon-rich products (bio-carbon) while simultaneously improving the properties of the remaining bio-oil with respect to refinery coprocessing or other biofuels applications. In an embodiment, a scheme for the production of premium bio-oil for coprocessing and high value carbon coproducts is depicted in FIG. 1.

Advanced pyrolysis approaches such as fast pyrolysis and catalytic fast pyrolysis can be used to produce feedstocks for manufacture of transportation fuels and bio-based chemicals, but a significant amount of high molecular weight material is also produced. This material is difficult and costly to convert to fuels and thus represents a low value stream. An alternate approach is to remove the 'heavies' via fractional distillation, and then upgrade the remaining bio-oil to fuels feedstocks and/or blendstocks. When bio-oil is used for co-processing in the refinery, removal of heavy fractions provides an upgraded distillate material that contains fewer coke precursors and hence represents a premium feedstock for refinery co-processing applications such as fluid catalytic cracking.

A portion of these heavy materials can be used to produce high-value carbon and graphite that can replace carbon/graphite from petroleum coke, coal tar, and natural mineral graphite. Industrially, calcined petroleum coke (CPC) is used as a filler material in anodes for electrochemical production of aluminum metal from alumina and iron smelting. CPC is also a critical component in the production of $TiO_2$, synthetic graphite and carbon steel.

In an embodiment, low value bio-oil residuum is used as a feedstock for manufacture of high value carbon rich coproducts. The general valorization scheme is illustrated in FIG. 1 which depicts production of bio-oil residuum (also known as "resid") by biomass liquefaction (pyrolysis) followed by fractional distillation of whole bio-oil. As with petroleum, bio-oil from advanced pyrolysis contains a wide range of molecular weight materials. In general, the heavier material is more difficult and/or costly to upgrade than are the lighter materials.

High value end markets exist for high-purity carbon-rich products. Residual fractions from advanced pyrolysis pathways contain very low levels of certain impurities such as metal porphyrins and sulfur, making them useful for producing carbon rich products requiring high purity specifications. Other techniques require energy intensive and environmentally unfriendly processing methods to reach high purity levels from existing carbon sources such as natural graphite and petroleum coke. In an embodiment, application of hot gas filtration can produce a bio-oil with almost zero inorganic content such as the carbon used in anodes for lithium ion batteries which requires very low levels of impurities (specifically sulfur, nickel and vanadium).

Thus, disclosed herein are methods to produce an inexpensive, renewable, and sustainable bio-derived replacement for natural or synthetic graphite currently used in lithium ion batteries and other energy storage media such as carbon capacitors. In an embodiment, these materials will be produced from residuum (resid) from bio-oil derived by fast pyrolysis (FP) or catalytic fast pyrolysis (CFP) of biomass. In an embodiment, advanced pathways to carbon-rich materials with a variety of end uses will be demonstrated, with a focus on using bio-derived graphite in LiB.

In an embodiment, the pathways to making bio-derived coke, graphite and graphene will provide a much less energy intensive route with dramatically lower greenhouse gas emissions for the manufacture of carbon-rich materials, thereby enabling the development of a new industry based on renewable and sustainable feedstocks with a concomitant reduction in use of environmentally problematic mineral and fossil resources. The discovery and development of innovative new pathways for producing functional replacements for mineral and synthetic graphite based on processes using renewable and sustainable feedstocks has the potential to revolutionize the energy storage industry by providing materials with significantly lower costs coupled with dramatically lower environmental manufacturing consequences.

In an embodiment, methods of making calcined coke and bio-graphite from bio-oil distillate residues are disclosed herein. Properties of bio-coke and bio-graphite processed from bio-oil, including elemental composition, trace metals content, crystallinity, electrical resistivity, and electrical capacity, have been determined. Table 1 and Table 2 shows the elemental analysis of resid and bio-coke, produced by calcining bio-oil derived from the resid at 1000° C. for 16 hours.

Table 1 and Table 2: elemental analysis of CFP resid (B-ZSM5 resid) and calcined bio-oil as bio-coke (D-ZSM5 calcined) produced from the CFP resid.

TABLE 1

| | C | H | O | S | Na | Al | N | Ca, Cr, Cu, Fe, Mg, Mn, Ni, P, K, V, Zn | Mass Ballance |
|---|---|---|---|---|---|---|---|---|---|
| CFP Residue | 79.4 | 6.0 | 15.0 | <0.01 | 0.017 | 0.23 | 0.14 | bdl | 100.5 |
| Calcined | 98.1 | <0.5 | 1.2 | <0.01 | <0.005 | <0.005 | 0.26 | bdl | 99.6 |

TABLE 2

| Lab Sample ID | Customer Sample ID | Aluminum µg/g | Calcium µg/g | Chromium µg/g | Copper µg/g | Iron µg/g | Magnesium µg/g | Manganese µg/g | Nickel µg/g | Phosphorus µg/g |
|---|---|---|---|---|---|---|---|---|---|---|
| 18H01635-002 | B-ZSM5 resid | 2320 | <50 | <10 | <10 | <50 | <10 | <2 | <10 | <100 |
| 18H01635-004 | D-ZSM5 calcined | <50 | <50 | <10 | <10 | <50 | <10 | <2 | <10 | <100 |

| Lab Sample ID | Customer Sample ID | Potassium µg/g | Sodium µg/g | Sulfur µg/g | Vanadium µg/g | Zinc µg/g | Carbon % w/w | Hydrogen % w/w | Nitrogen % w/w | Oxygen % w/w |
|---|---|---|---|---|---|---|---|---|---|---|
| 18H01635-002 | B-ZSM5 resid | <50 | 170 | <100 | <2 | <5 | 79.36 | 5.96 | 0.14 | 15.06 |
| 18H01635-004 | D-ZSM5 calcined | <50 | <50 | <100 | <2 | <5 | 98.10 | <0.5 | 0.26 | 1.22 |

As depicted in Table 1 and Table 2, the bio-coke is high in fixed carbon (>98%), very low in sulfur (below detection limits), and low in ash. Without being limited by theory, inorganics present in the bio-coke are likely to be mostly alkali and alkaline earth metals along with silica.

Figures 5A, 5B:
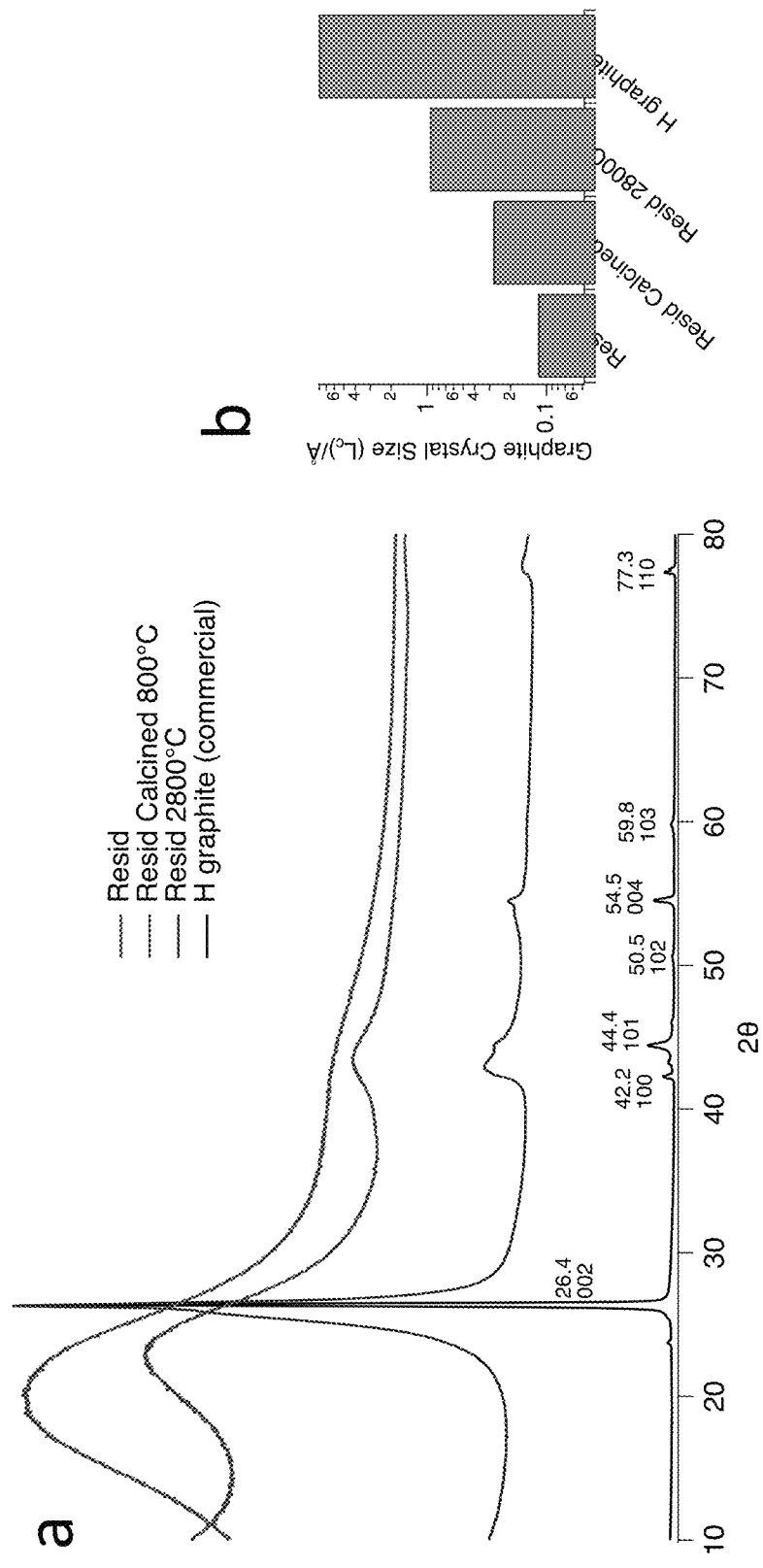
Figure 6:
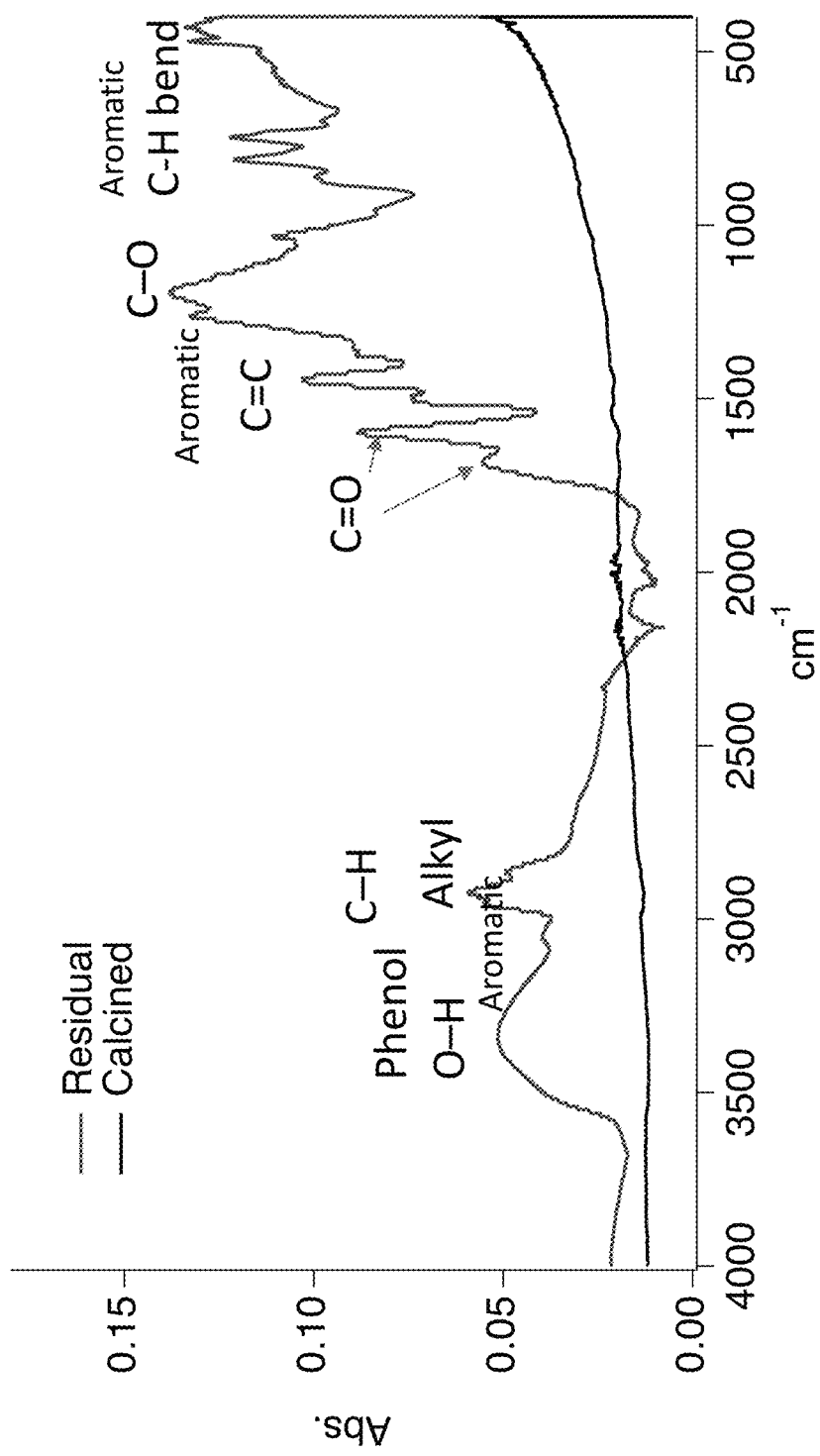
FIG. 6 depicts infrared spectra of resid and calcined resid.

The x-ray powder diffraction (XRD) pattern of bio-coke made using methods disclosed herein, compared to commercially available graphite is shown in FIG. 5a. Resid calcined at 800° C. and the resid treated at 2800° C. produces a material with XRD spectra shown in FIG. 5a which represents the evolution of graphite-type properties in both of the calcined bio-oil resid samples. FIG. 5b depicts the size of the graphite crystals in the resid, resid calcined at 800° C., resid treated at 2800° C. and commercially available non-bioderived graphite whose XRD spectra are depicted in FIG. 5a.

Figures 7A, 7B:
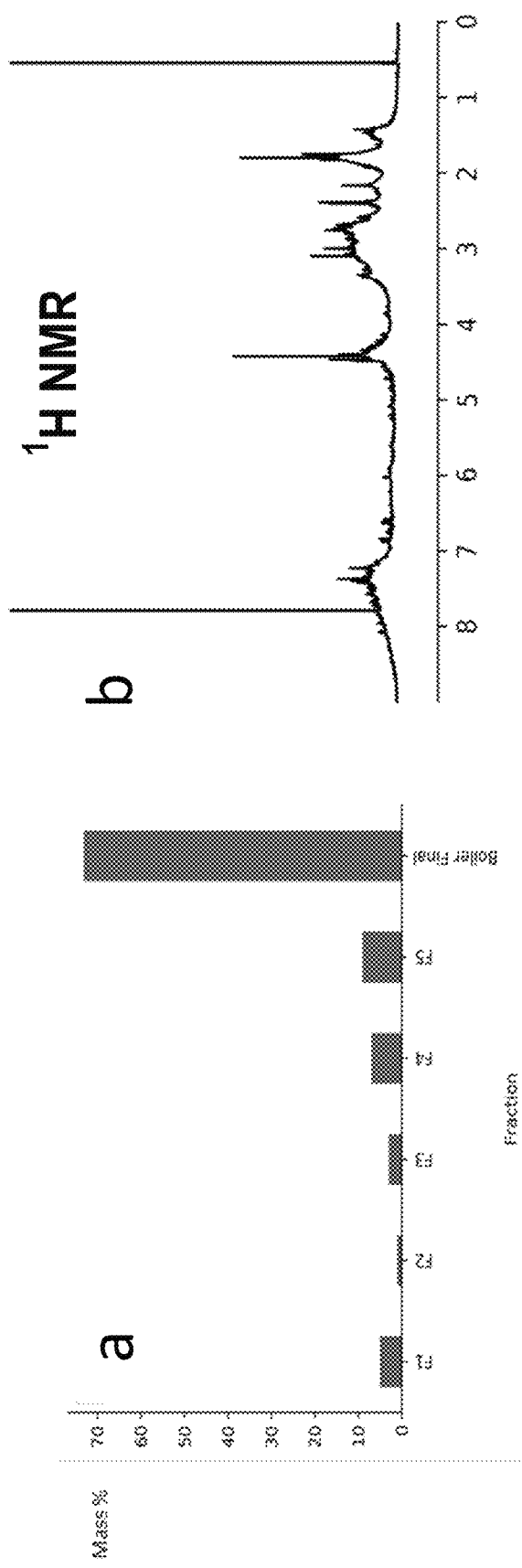
Figure 8:
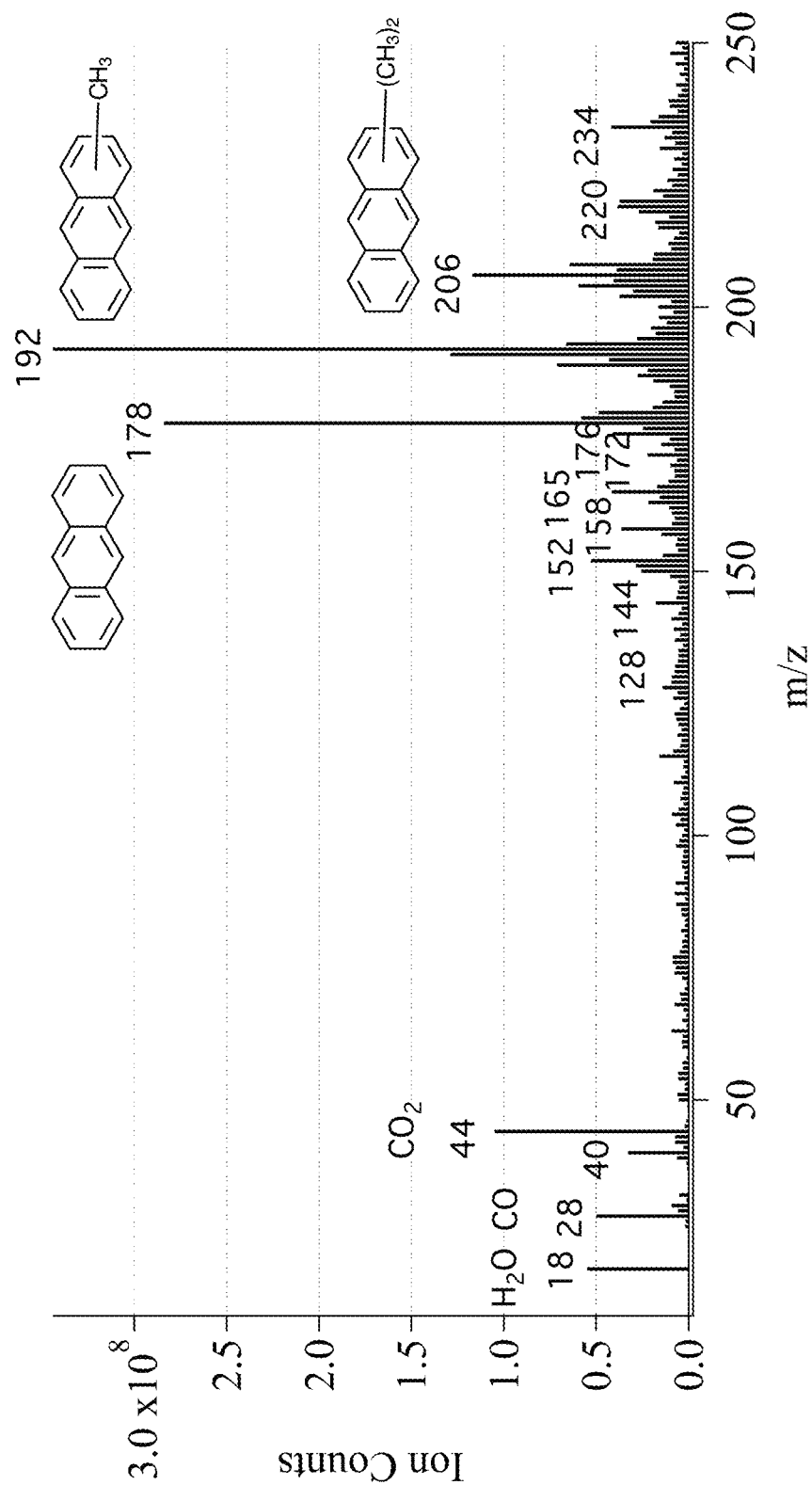
FIG. 8 depicts the mass spectra of the contents of bio-crude residue.
Figure 9A:
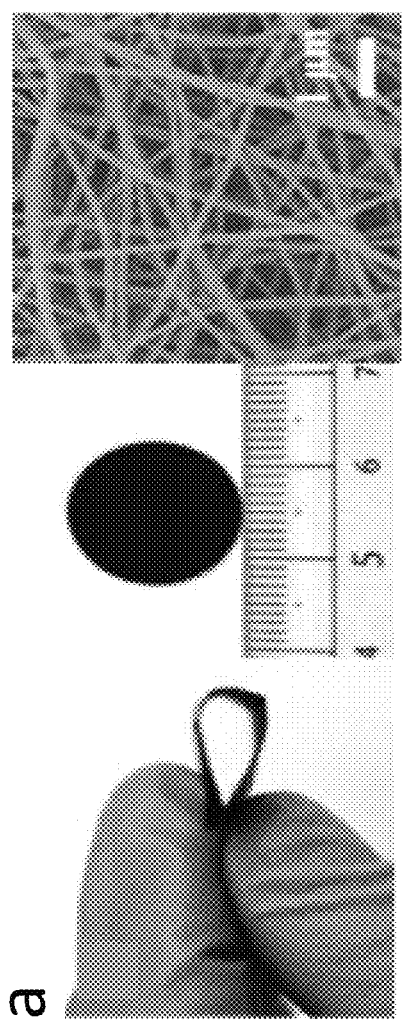
FIGS. 9a and 9b depict various embodiments of graphene that could be useful in the production of LiBs as contemplated herein.
Figure 9B:
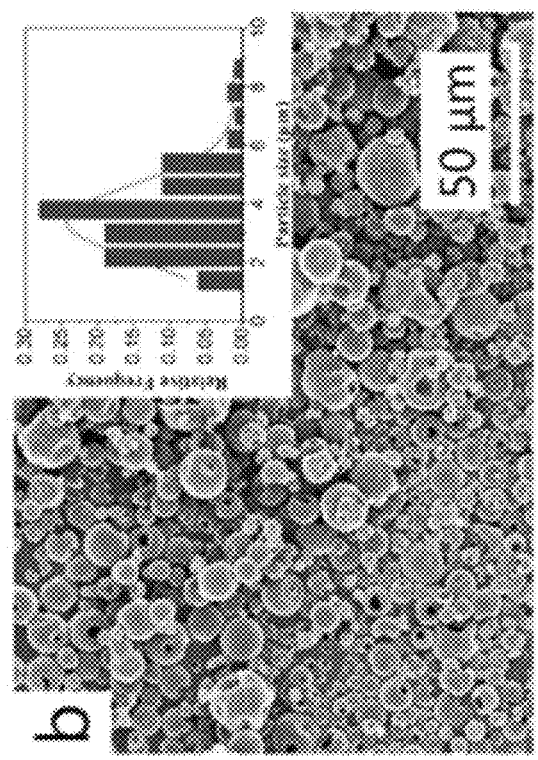

In an embodiment, experiments were conducted to graphitize bio-oil resid and tests of the material were carried out in a coin-cell LiB. Bio-oil was collected from the CFP of pine using a ZSM-5 catalyst. Oil was distilled at atmospheric pressure to a temperature of 300° C. and this material, which was solid at ambient temperature, was calcined at 800° C. under nitrogen and graphitized at 2200° C. As depicted in FIG. 7a, after distillation of various fractions of from bio-oil, the resid consists of about 70% of the mass of the bio-oil. As depicted in FIG. 7b, the relative amounts of carbon types in the resid was determined by $^1$H NMR to be as follows: 4.3% carbonyl; 15.9% aromatic C—O; 10.8% aromatic C—C; 37.5% aromatic C—H; 2.0% aliphatic C—O; 2.3% methoxyl; 27.2% aliphatic C—C. Thus, an analysis of the residual showed that it was primarily composed of aromatic carbon atoms. As depicted in FIG. 8, mass spectrometry measurements of the vapors evolved during the calcination step show that they were composed primarily of anthracene (or phenanthrene) and methylated anthracenes.

Thermogravimetric analysis (TGA) showed volatilization between 300° C. and 500° C., which is consistent with this class of molecules and confirms the highly aromatic nature of the residual material. Volatilization could be controlled by heating rate and the high molecular weight volatiles (anthracenes) could be recycled into the resid stream. As depicted in Table 1 and Table 2, after calcination, elemental analysis using ICP showed that the levels of metals, alkali metals and sulfur were below the detection limits.

In an embodiment, heating bio-oil resid to 2200° C. produced a crystalline graphitic material (as determined using XRD) that had a charge capacity of 300 mAhg$^{-1}$ in battery tests whereas commercial anode-grade graphite is typically 350 mAhg$^{-1}$. The aromatic composition and the lack of impurities in the residual make it an ideal for graphitization, requiring less severe conditions and decreasing the overall cost.

In another embodiment, it is contemplated that using methods disclosed herein bio-oil residue will be calcined from both FP and CFP using two different catalysts. These materials will provide a range of materials with different concentrations of aromatic and oxygenated molecules. In an embodiment, disclosed herein are calcining approaches (heating rates and temperatures) to reduce losses and enhance aromatic composition, which will affect the ease of graphitization.

Graphitization and battery tests will be conducted on the materials made by using methods disclosed herein such as the effect of graphitization temperatures from 2000° C. to 3100° C. on capacity and cycling using coin batteries. In an embodiment, analysis of the resids, calcined material and final graphite will be conducted.

Figure 2:
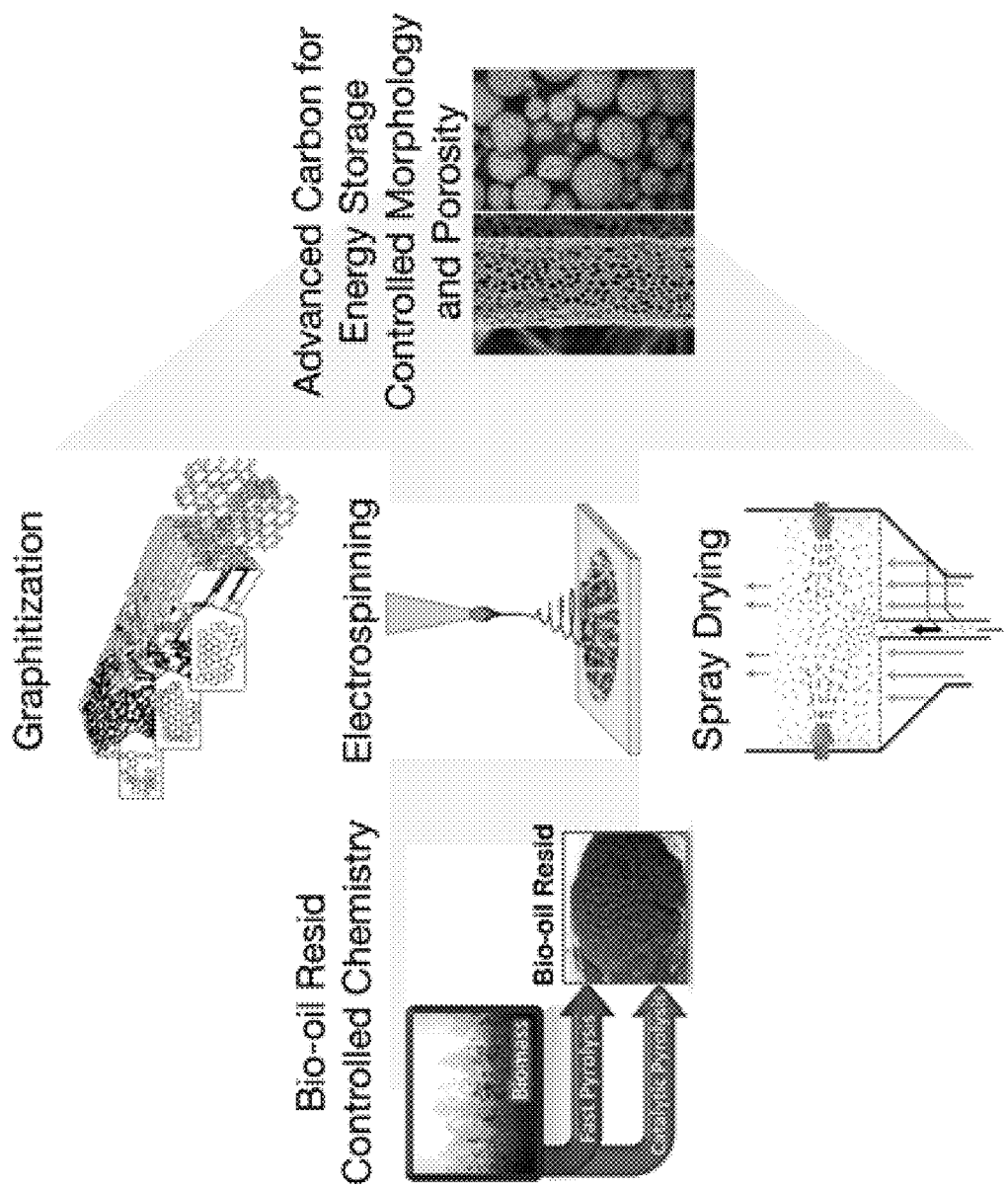
FIG. 2 depicts various techniques that can be used to convert bio-oil resid into bio-graphite materials.
Figure 3:
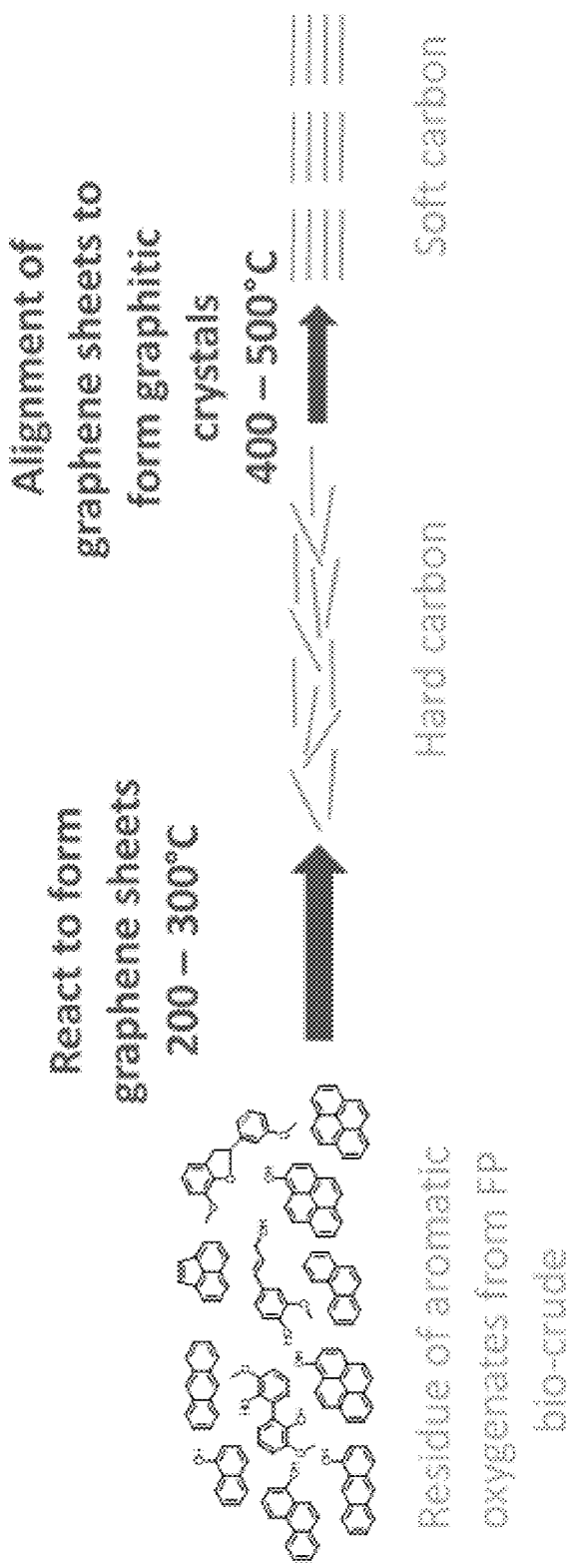
FIG. 3. depicts a scheme making various grades of graphene from bio-crude.
Figure 4:
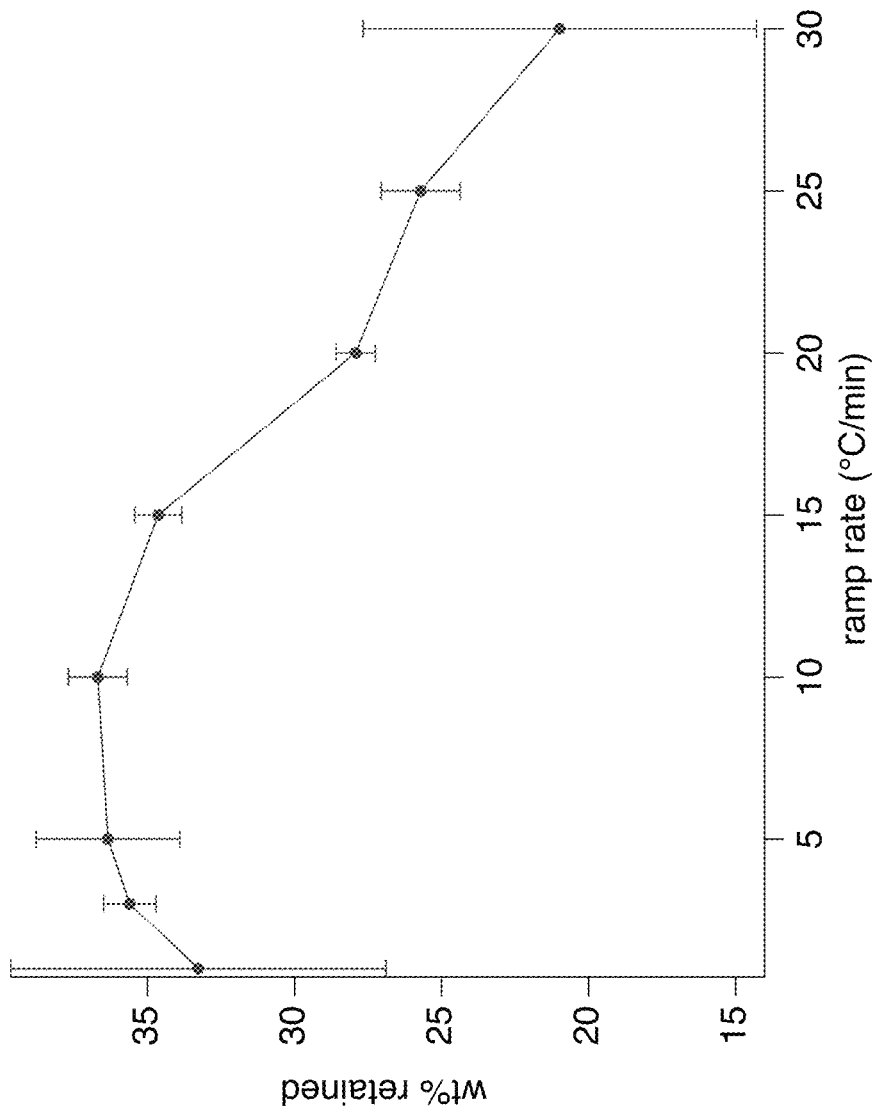
FIG. 4 depicts a weight retention profile of a bio-crude sample versus ramp rates of heating.

In an embodiment, it is further contemplated that in addition to straight thermal graphitization, other approaches to convert bio-oil resid from the vacuum distillation into highly carbonaceous graphite-like material will be explored. Referring to FIG. 2, processing methods such as electrospinning to produce bio-derived carbon nanofibers and spray drying to produce bio-derived carbon spheres will be determined. In an embodiment, these methods will provide reduced energy intensity as the operating temperatures are significantly lower relative to conventional calcination followed by graphitization, which can proceed at temperatures above 3000° C. It is contemplated that two of the pathways (electrospinning and spray drying) can be operated in continuous flow, which provides additional efficiency when compared to batch calcination/graphitization. Without being bound by theory, it is contemplated that bio-oil resid is ideal for the electrospinning and spray drying processes as it is a high carbon content fluid (i.e. not a solid). It is expected that electrospinning of the resid will produce highly carbonaceous graphite-like nanofibrils. These fibers are likely to contain significant porosity due to evaporation of the carrier solvent during the electrospinning operation but are produced at much less severe conditions (temperatures of from about 700-800° C.) compared to upgrading of mineral or petroleum feedstocks.

It has been previously shown that work with non-biologically derived porous carbon nanofibers results in lithium ion capacities that can be greater than 1000 mAhg$^{-1}$. The mats created from these fibers are well suited for LiB forms. In an embodiment, an alternative approach is spray drying to produce the required spherical morphology for use in LiBs. Like electrospinning, these micro/nano carbon spheres will likely be highly porous in nature and additionally have a high packing density.

In an embodiment, the uniform particle sizes created with this approach is ideal for batteries because it avoids mass loss from required sieving. In an embodiment, the products may need to be finished by CVD carbon coating following standard industry protocols. Depending on conditions used to the nanofibrils and carbon spheres, it is possible that further treatment by carbon coating typically done to improve cycling lifetime may not be needed.

In an embodiment, processing of the bio-resid will produce graphite that meets specifications required for LiB (a reversible capacity of greater than 300 mAh/g with a capacity retention 80% after 200 cycles in a full cell configuration) and carbon capacitors.

In an embodiment, the purity of the bio-graphite created using methods disclosed herein will be very high (greater than about 99.95% Cg) and inorganic impurities will be measured using standard Inductively Coupled Plasma (ICP) techniques, while graphitic content and crystallinity will be measured using XRD and Raman spectroscopy. The highly aromatic composition of the bio-residual facilitates graphite formation during heating by making the mesophase more accessible. In addition to crystallinity, volumetric lithium ion capacitance is very important for many LiB applications. In conventional LiBs, spherodization is used tightly pack and orient the graphite at the anode, and this process results in large losses (up to 60%) of the mineral flake graphite. Finally, stability of the anodic material during charge/discharge cycling is necessary, and spray drying is an inexpensive way to coat graphite particles with bio-pitch to stabilize them.

In an embodiment, it is contemplated that calcined bio-resids will be produced under different biomass conversion conditions (e.g. fast pyrolysis, catalytic fast pyrolysis with different catalyst) to demonstrate the effects of resid composition on material loss and composition of calcined material. In another embodiment, bio-graphite will be produced at different temperatures from calcined bio-resid. In yet another embodiment, batteries will be produced from the bio-graphite made under different biomass conversion conditions.

It is contemplated that making LiB using methods disclosed herein that electrochemical analysis will inform how process variables effect battery performance, such as capacity, reversibility and rate performance. In an embodiment, various electro-spun fibers from various bio-resid sources will be produced and characterized. Fiber characterization will demonstrate how electrospinning processing conditions effects fiber properties. Electrochemical properties will be evaluated for the graphitic fibers.

In another embodiment, it is contemplated that various carbon spheres will be made using methods disclosed herein. The carbon spheres will be characterized by measuring different properties (e.g. porosity, dispersity, surface area) from various sources of bio-resid.

In yet another embodiment, batteries made from carbon spheres and graphitic fibers using methods disclosed herein will be characterized for charge density and other capacitive characteristics.

In another embodiment, it is contemplated that the carbon spheres made using methods disclosed herein will be processed by various methods such as spray drying processing conditions. The structural effects imparted upon the carbon spheres through these various methods of process will be analyzed. In addition, the electrochemical properties for the carbon spheres made that have various morphologies will be determined. The optimal morphology for battery applications of the carbon spheres will be determined.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for making coke derived from biomass, comprising pyrolyzing the biomass to make bio-oil; and distilling the bio-oil to produce light and heavy fractions; and calcining the heavy fractions; and graphitizing the calcined heavy fractions at a temperature from about 2000° C. to about 3100° C.; wherein the coke has greater than about 98% w/w carbon content, and less than about 0.01% w/w sulfur content, and less than about 0.05% w/w hydrogen content; and wherein the coke has a charge capacity of greater than about 300 mAhg$^{-1}$; and wherein the coke has less than about 0.11% w/w ash content.

2. The method of claim 1 wherein the heavy fractions are calcined from about 700° C. to about 1000° C.

3. A method for making graphite derived from biomass comprising pyrolyzing the biomass to make bio-oil; and distilling the bio-oil to produce light and heavy fractions; and calcining the heavy fractions; and graphitizing the calcined heavy fractions at a temperature from about 2000° C. to about 3100° C.; wherein the graphite has greater than about 98% w/w carbon content, and less than about 0.01% w/w sulfur content, and less than about 0.05% w/w hydrogen content; and wherein the graphite has a charge capacity of greater than about 300 mAhg$^{-1}$; wherein the graphite has less than about 0.11% w/w ash content.

4. The method of claim 3 wherein the heavy fractions are calcined from about 700° C. to about 1000° C.

5. A method for making graphene derived from biomass comprising pyrolyzing the biomass to make bio-oil; and distilling the bio-oil to produce light and heavy fractions; and calcining the heavy fractions; and graphitizing the calcined heavy fractions at a temperature from about 2000° C. to about 3100° C.; wherein the graphene has greater than about 98% w/w carbon content, and less than about 0.01% w/w sulfur content, and less than about 0.05% w/w hydrogen content; wherein the graphene has a charge capacity of greater than about 300 mAhg$^{-1}$; wherein the graphene has less than about 0.11% w/w ash content.

6. The method of claim 5 wherein the heavy fractions are calcined from about 700° C. to about 1000° C.

* * * * *